United States Patent [19]

Nguyen et al.

[11] Patent Number: 5,923,862
[45] Date of Patent: Jul. 13, 1999

[54] PROCESSOR THAT DECODES A MULTI-CYCLE INSTRUCTION INTO SINGLE-CYCLE MICRO-INSTRUCTIONS AND SCHEDULES EXECUTION OF THE MICRO-INSTRUCTIONS

[75] Inventors: Le Trong Nguyen, Monte Sereno; Heonchul Park, Cupertino, both of Calif.

[73] Assignee: Samsung Electronics Co., Ltd., Rep. of Korea

[21] Appl. No.: 08/789,574

[22] Filed: Jan. 28, 1997

[51] Int. Cl.[6] .......................................... G06F 9/22
[52] U.S. Cl. ...................... 395/384; 395/595; 395/800.23
[58] Field of Search ..................... 395/379, 384, 395/385, 386, 387, 388, 389, 595, 596, 597, 598, 800.23, 800.24

[56] References Cited

U.S. PATENT DOCUMENTS

| | | | |
|---|---|---|---|
| 4,415,969 | 11/1983 | Bayliss et al. | 395/387 |
| 5,398,321 | 3/1995 | Jeremiah | 395/595 |
| 5,442,760 | 8/1995 | Rustad et al. | 395/800.24 |
| 5,504,932 | 4/1996 | Vassiliadis et al. | 395/384 |
| 5,542,060 | 7/1996 | Yoshida | 395/384 |
| 5,619,666 | 4/1997 | Coon et al. | 395/384 |
| 5,669,011 | 9/1997 | Alpert et al. | 395/386 |
| 5,699,536 | 12/1997 | Hopkins et al. | 395/379 |

*Primary Examiner*—Richard L. Ellis
*Attorney, Agent, or Firm*—Skjerven, Morrill. MacPherson, Franklin & Friel LLP; David T. Millers

[57] ABSTRACT

An instruction decoder in a processor decodes an instruction by creating a decode buffer entry that includes global fields, operand fields, and a set of micro-instructions. Each micro-instruction represent an operation that an associated execution unit can execute in a single clock cycle. A scheduler issues the micro-instructions from one or more entries to the execution units for possible parallel and out-of-order execution. Each execution unit completes an operation, typically, in one clock cycle and does not monitor instructions that may block a pipeline. The execution units do not need separate decoding for multiple stages. One global field indicates which micro-instructions are execute first. Further, micro-instructions have fields that indicate an execution sequence. The scheduler issues operations in the order indicated by the global fields and the micro-instructions. When the last operation for an instruction is completed, the instruction is retired and removed from the decode buffer.

15 Claims, 4 Drawing Sheets

Microfiche Appendix Included
(1 Microfiche, 58 Pages)

| WRITE_μI |

FIG. 5A

| LSU_μI |

FIG. 5B

| ALU1_μI | LSU_μI |

FIG. 5C

| LSU_μI | ... | WRITE_μI |

FIG. 5D

| ALU1_μI | LSU_μI | ... | WRITE_μI |

FIG. 5E

| ALU1_μI | WRITE_μI |

FIG. 5F

| ALU1_μI | WRITE_μI |
| ALU2_μI | |

FIG. 5G

| ALU1_μI | ALU2_μI | WRITE_μI |

FIG. 5H

| MULT_μI | ALU1_μI | WRITE_μI |
| | ALU2_μI | |

FIG. 5I

| MULT_μI | ALU1_μI | ALU2_μI | WRITE_μI |

FIG. 5J

PROCESSOR THAT DECODES A MULTI-CYCLE INSTRUCTION INTO SINGLE-CYCLE MICRO-INSTRUCTIONS AND SCHEDULES EXECUTION OF THE MICRO-INSTRUCTIONS

REFERENCE TO MICROFICHE APPENDIX

The present specification comprises a microfiche appendix. The total number of microfiche sheets in the microfiche appendix is one. The total number of frames in the microfiche appendix is 58.

BACKGROUND OF THE INVENTION

1. Field of the Invention

This invention relates to processors and to circuits and methods for scheduling and controlling execution of instructions.

2. Description of Related Art

A single instruction multiple data (SIMD) processor uses a single sequential program thread for parallel manipulations of multiple data elements. The multiple data elements when grouped together form a "vector" that can be stored in a single "vector register." Vector registers have wide data widths to accommodate vectors that are operands for SIMD instructions. Processing vectors increases processing power because each vector operation performs multiple parallel calculations, e.g. one calculation per data element.

Superscalar architectures provide another way to increase processor power. A superscalar processor executes a sequential program thread but permits parallel and out-of-order execution of independent instructions. Parallel and out-of-order execution provides higher performance by reducing the time that processing circuitry is idle. Typically, a superscalar processor contains a scheduler and multiple executions units that can operate in parallel. Each clock cycle, the scheduler attempts to select from the program thread multiple instructions for issue to the execution units. Typically, the scheduler checks execution unit availability and operand dependencies and only issues an instruction if the necessary execution unit and operands are available.

An execution unit often requires multiple clock cycles to execute an instruction with the number of clock cycles depending on the instruction. Typically, an execution unit operates as a pipeline having multiple stages, and the scheduler cannot issue an instruction to an initial stage of the pipeline if a blockage in the pipeline keeps a previously issued instruction in the first stage. In the pipeline, different data and resources may be required at different stages, and future availability of such data and resources can be difficult to determine when the scheduler issues an instruction to an execution unit. Accordingly, schedulers often issue instructions without completely evaluating whether necessary resources and data will be available.

Execution pipelines may require complex circuitry to monitor execution of several types of instructions. When the scheduler issues an instruction to the initial stage of an execution pipeline, the execution unit decodes parameters at each stage to determine the proper action at that stage. Additionally, the latencies (or numbers of stages) for instructions vary which further increases execution unit complexity. Use of a uniform number of execution cycles per instruction is typically not feasible because instructions sets, even reduced instruction set computing (RISC) instruction sets, include instructions that cannot be executed in the same time as the simplest instructions. A simpler processor architecture is desired.

SUMMARY OF THE INVENTION

In accordance with an embodiment of the invention, an instruction decoder in a processor decodes an instruction by creating an entry in a decode buffer where the entry includes a set of micro-instructions. Each micro-instruction represents a single-stage operation that an associated execution unit can typically execute in a single processor cycle. A scheduler coupled to the decode buffer issues the operations from one or more entries to the execution units for possible parallel and out-of-order execution. The execution units are relatively small and simple because each execution units completes single stage operations and does not need to perform separate decoding for multiple stages or monitor instructions that may block a pipeline.

In accordance with a further aspect of the invention, each entry has global fields that indicate, for example, which operation should be executed first. Further, each micro-instruction has a field that indicates which operation is executed next. The scheduler issues operations in the order indicated by the global fields and the micro-instructions. When the last operation for an instruction is completed, the instruction is retired and removed from the decode buffer.

BRIEF DESCRIPTION OF THE DRAWINGS

FIGS. 5A, 5B, 5C, 5D, 5E, 5F, 5G, 5H, 5I, and 5J illustrate sequences of single-stage operations for execution of instructions in accordance with an embodiment of the invention.

Use of the same reference symbols in different figures indicates similar or identical items.

DETAILED DESCRIPTION OF THE PREFERRED EMBODIMENTS

Figure 1:
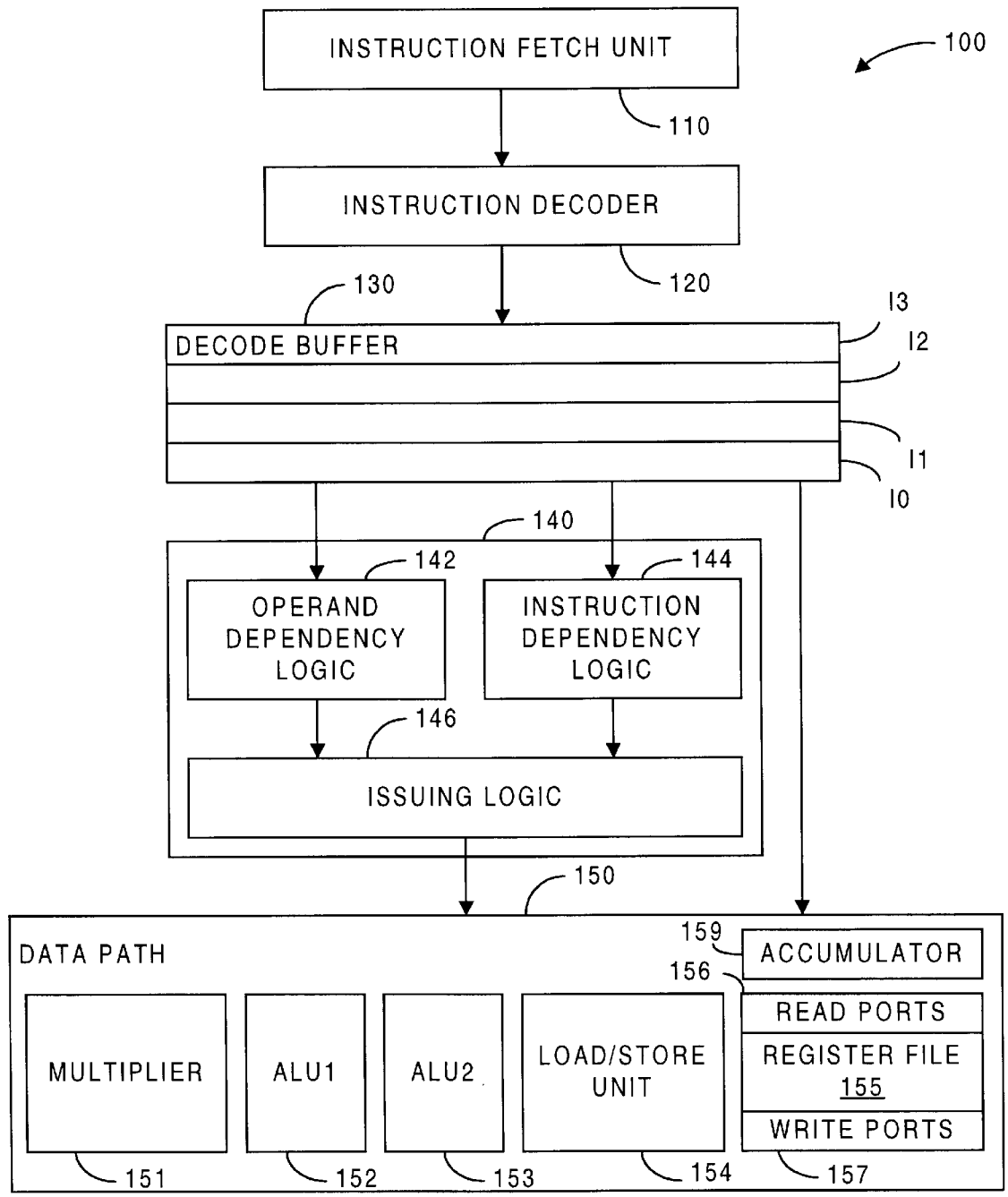
FIG. 1 is a block diagram of a processor in accordance with an embodiment of the invention.

FIG. 1 illustrates a processor 100 in accordance with an embodiment of the invention. Processor 100 includes an instruction decoder 120 that decodes instructions from an instruction fetch unit 110 and writes decoded entries in decode buffer 130. In accordance with an aspect of the invention, each entry stores a set of micro-instructions where the micro-instructions represent operations (mostly single-cycle operations) that must be executed to complete an associated instruction. Each micro-instruction corresponds to an operation by an execution unit 151 to 154 or an access of register file 155. Read ports 156 and write ports 157 execute read and write operations that access register file 155.

Processor 100 further includes a scheduler 140 that each cycle attempts to select and issue multiple micro-instructions from decode buffer 130. Scheduler 140 includes issuing logic 146, operand dependency logic 142, and instruction dependency logic 144. Issuing logic 146 selects and issues micro-instructions to the proper execution units and permits out-of-order and parallel execution to increase utilization of the execution units and enhanced processor performance.

Operand dependency logic 142 determines whether particular instructions having entries in decode buffer 130 have operand dependencies or otherwise depend on the results of preceding operations so that the instructions cannot be executed out-of-order. Instruction dependency logic 144 disables issue of particular micro-instructions to maintain a desired relative order of execution for micro-instructions in the same entry and disables issue of starting micro-instructions from particular entries to avoid conflicts in use of execution units.

An exemplary embodiment of processor 100 is a single instruction multiple data (SIMD) processor having an instruction set described in co-owned U.S. patent application Ser. No. 08/699,597, entitled "SINGLE-INSTRUCTION-MULTIPLE-DATA PROCESSING IN A MULTIMEDIA SIGNAL PROCESSOR," which is incorporated by reference herein in its entirety. A listing of the instruction set for the exemplary embodiment is found below.

Figure 2:
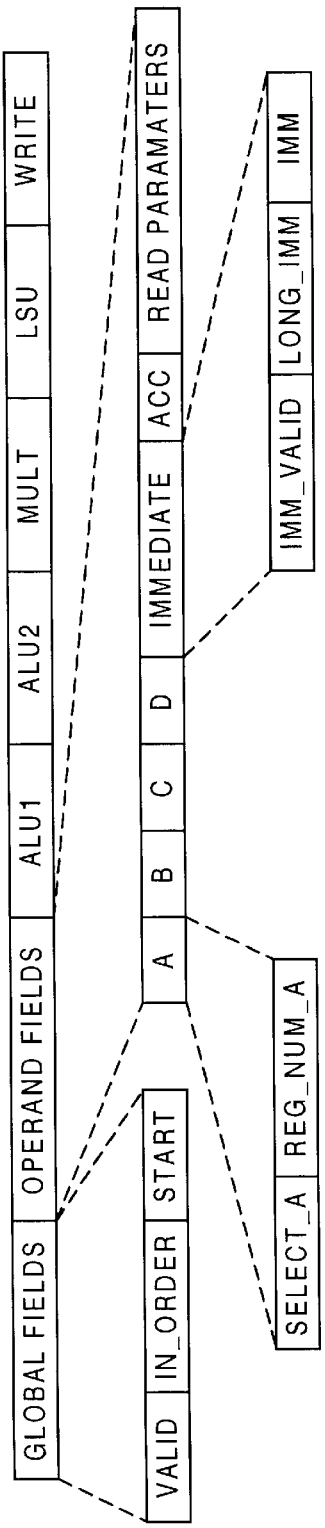
FIG. 2 shows contents of an entry in a decode buffer in the processor of FIG. 1.
Figure 3:
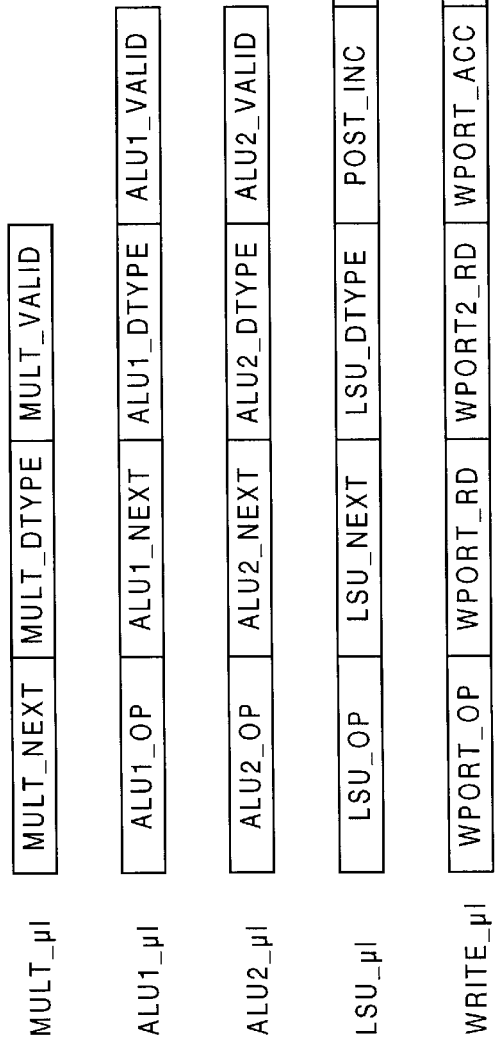
FIG. 3 illustrates a syntax for micro-instructions for the entry of FIG. 2.

FIG. 2 illustrates a format for an entry in decode buffer 130 in the exemplary embodiment. Each entry in the exemplary embodiment includes global fields, operand fields, and micro-instruction fields MULT, ALU1, ALU2, LSU, and WRITE. Fields MULT, ALU1, ALU2, LSU, and WRITE are for micro-instructions MULT_μI, ALU1_μI, ALU2_μI, LSU_μI, and WRITE_μI respectively. Exemplary syntaxes for micro-instructions MULT_μI, ALU1_μI, ALU2_μI, LSU_μI, and WRITE_μI are shown in FIG. 3 and described below.

The global fields include a field VALID which indicates whether the entry represents an instruction to be executed, a field IN_ORDER which indicates whether the instruction can be executed out of the program order, and a field START that indicates which of fields MULT, ALU1, ALU2, LSU, and WRITE contains the micro-instruction or micro-instructions that are executed first.

Operand fields A, B, C, and D describe of up to four operands for an instruction. Operand fields A and B, if used, indicate source operands required for the first micro-instruction. Operand field D, if used, indicates a destination operand. Operand field C, if used, indicates a source or a destination operand depending on the instruction. In the exemplary embodiment, operand field C indicates a destination register in most cases. For example, shuffle and unshuffle instructions mix data elements from two source vector operands A and B and store the result in two destination operands C and D. Instructions that retrieve or generate double sized results may use two destination operands C and D. Some element shift instructions also have two destination operands. For a store or a multiply-and-add instruction, operand field C represents a source operand that is required after the first micro-instructions executed, for example, a store operand or an addend.

Each operand field A, B, C, and D includes a field SELECT and field REG_NUM which identify the operand. An operand can be a scalar or vector register in register file 155, an accumulator 159 in data path 150, or a special register such as a status or control register. Source operands may additionally be an immediate value from the instruction or a constant value selected by the execution unit. Field SELECT indicates a class for the operand. Classes include operands to or from register file 155, from a read buffer of load/store unit 154, from the immediate field, and to or from an execution unit or accumulator 159. Field REG_NUM is a register number when the operand class is a register. In the exemplary embodiment, register numbers are 7-bit values that identify an individual register in register file 155 which contains a foreground bank of 32 288-bit vector registers, a background bank of 32 288-bit vector registers, 32 32-bit scalar registers, and up to 32 special registers.

In the exemplary embodiment, accumulator 159 is a double size vector register that stores a high vector value and a low vector value. A field ACC identifies the high or low vector from accumulator 159 as a source or destination operand.

A field IMMEDIATE includes three sub-fields IMM_VALID, LONG_IMM, and IMM. Field IMM_VALID indicates whether the associated instruction includes an immediate value. If the instruction does include an immediate value, field LONG_IMM indicates the length of the immediate value, and a field IMM contains the immediate value.

The operand fields additionally contain read parameters to indicate and track read operations because the exemplary embodiment allows double size operands which have twice the width of a vector register and may required two clock cycles to fetch.

An instruction is issued when scheduler 140 issues the starting micro-instruction(s) from the associated entry. In the clock cycle that scheduler 140 selects an instruction for issue, scheduler 140 also fetches the source operands A and B if required. Scheduler 140 can issue an instruction out-of-order unless field IN_ORDER of the instruction's entry forbids out-of-order execution or an older uncompleted instruction writes to a source register of the instruction. Operand dependency logic 142 compares the operand fields A, B and C, if valid sources, of each entry to the operand fields C and D, if valid destinations, of older instructions and prevents issue of the starting micro-instruction if a match is found. Whether respective fields are valid sources or destination can be determined from the operand fields or the valid micro-instructions in the entry.

In the exemplary embodiment of the invention, decode buffer 130 has four entries I0 to I3 where I0 corresponds to the oldest instruction (i.e. the first in program order) and I3 corresponds to the newest instruction (i.e. the last in the program order). Operand dependency logic 142 in scheduler 140 compares the source operands of entry I3 to the destination operands of entries I0 to I2. If none of the source operands of entry I3 are the same as any of the destination operands indicated in entries I0 to I2 and field IN_ORDER permits out-of-order execution, the instruction associated with entry I3 is eligible for issue. Similarly, operand dependency logic 142 compares the source operands of entry I2 to the destination operands of entries I0 and I1 and compares the source operands of entry I1 to the destination operands of entry I0 to determine if instructions corresponding to entries I2 and I1 are eligible for issue. The instruction corresponding to entry I0 is always eligible for issue.

After fetching the source operands, operations associated with the valid micro-instructions in an entry are executed in an order indicated by the entry. A typical last operation writes a result to register file 155. Once the last operation is completed, an instruction is retired by removing the associated entry from decode buffer 130. In the exemplary embodiment of the invention, decode buffer 130 is collapsible so that any instruction can be retired; and when an instruction is retired, newer entries in decode buffer 130 shift to fill the entry of the retired instruction and make room for a newest entry from decoder 120. Alternatively, decode buffer 130 is a first-in-first-out (FIFO) buffer where instructions are retired only after all older instructions (i.e. instructions preceding in the program order) have been retired.

Figure 4:
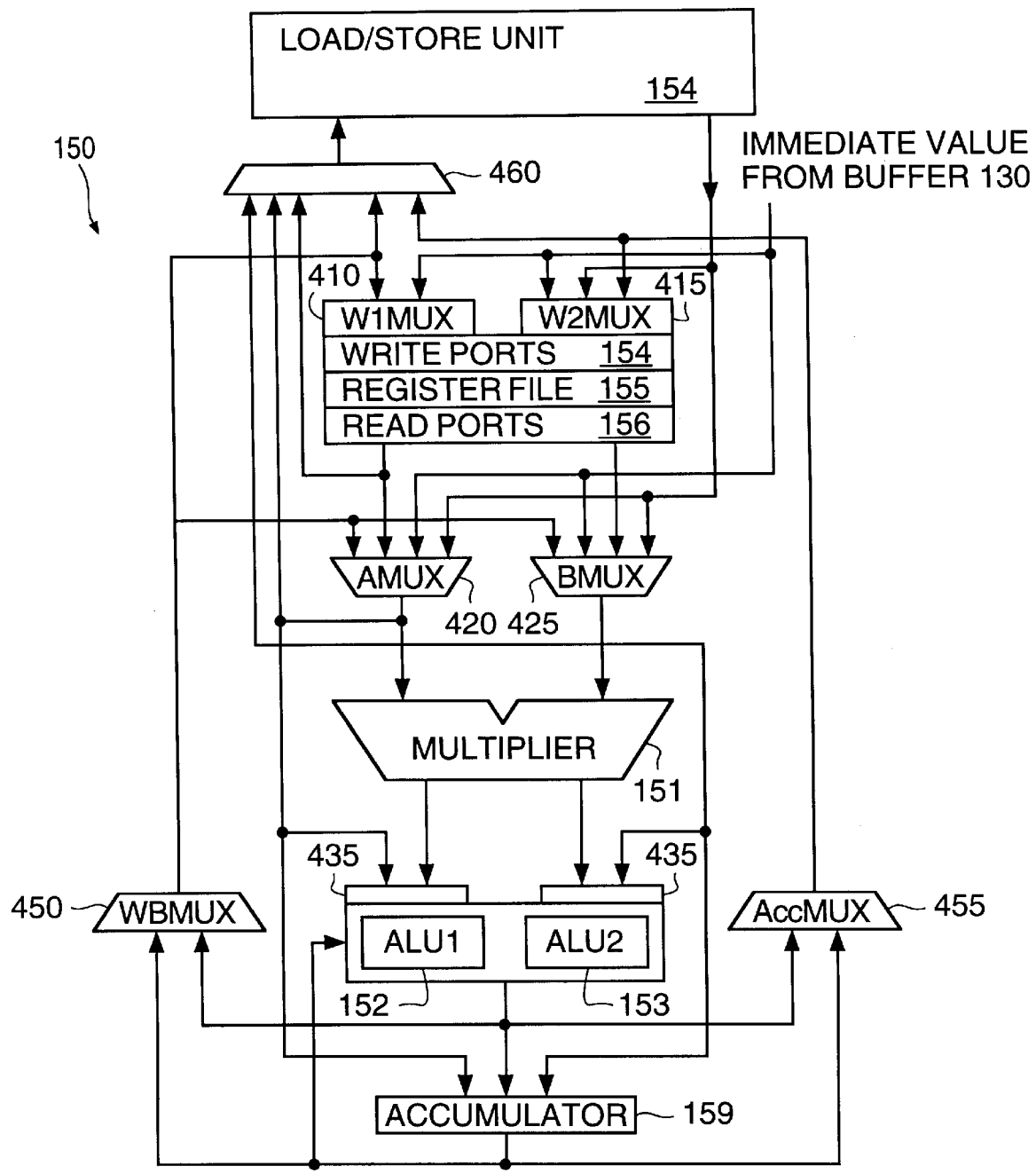
FIG. 4 shows data paths for a processor in accordance with an embodiment of the invention.

FIG. 4 illustrates data path 150 adapted to the entry syntax shown in FIGS. 2 and 3. Data path 150 includes multiplier 151, arithmetic logic units 152 and 153, load/store unit 154, register file 155, and accumulator 159. Read ports 156 of register file 155 are coupled to multiplier 151 and arithmetic logic units 152 and 153 through multiplexers 420 and 425 and to load/store unit 154 through a multiplexer 460. Multiplexers 420 and 425, which can provide source operands to any of execution units 151 to 154 or accumulator 159, select from among data read from register file 155, an immediate value from buffer 130, a value from load/store unit 154, and an output value from an arithmetic logic unit 152 or 153 or from accumulator 159 via multiplexers 450 and 455. The input values for execution units 151, 152, and 153 are from multiplexers 420 and 425 or values selected at the input ports of respective execution unit 151, 152, or 153. Multiplexer 460 selects from among the output signals from multiplexers 420 and 425, a value read from register file 155, and values from arithmetic logic unit 152 or accumulator 159 via multiplexers 450 and 455. For memory access, load/store unit 154 uses an immediate value, a source operand, or an effective address calculated by arithmetic logic unit 152 as an address. For a store operation, a store operand B or C or an immediate value indicates the value to be stored.

Scheduler 140 issues an instruction by fetching required source operands A and B if used. The following clock cycle the starting micro-instruction (or micro-instructions) as indicated by global field START within an entry is executed. Operand C, if a valid source operand, is fetched when required by the micro-instructions. Register file 155 has two read ports so that up to two operands can be fetched from register file 155 per clock cycle, and scheduler 140 cannot issue an instruction requiring two source operands in the same cycle that a micro-instruction that requires operand C is issued.

Multiplier 151, arithmetic logic unit 152, arithmetic logic unit 153, and load/store unit 154 respectively perform the operations indicated by micro-instructions MULT_$\mu$I, ALU1_$\mu$I, ALU2_$\mu$I, and LSU_$\mu$I. Write ports 157 and write circuitry for accumulator 159 and the special registers perform the operation indicated by micro-instruction WRITE_$\mu$I. Syntaxes for micro-instruction MULT_$\mu$I, ALU1_$\mu$I, ALU2_$\mu$I, LSU_$\mu$I, and WRITE_$\mu$I are tailored to the capabilities of the execution units which perform the indicated operations. FIG. 3 illustrates the syntax for micro-instruction MULT_$\mu$I, ALU1_$\mu$I, ALU2_$\mu$I, LSU_$\mu$I, and WRITE_$\mu$I for the exemplary embodiment and are described in conjunction with data path 150 as illustrated in FIG. 4.

Micro-instruction MULT_$\mu$I includes fields MULT_NEXT, MULT_DTYPE, and MULT_VALID. Field MULT_VALID indicates whether the micro-instruction should be executed and is set for instructions such as a multiply or multiply-and-accumulate that require multiplier 151. Field MULT_DTYPE indicates a data type for the data elements in the operands processed by multiplier 151. In embodiment of FIG. 4, multiplier 151 multiplies data elements having a 32-bit floating point data type or an 8, 9, 16, or 32 bit integer data type. Multiplier 151 performs up to 32 multiplications in parallel for 8-bit data elements. U.S. patent application Ser. No. 08/734,277, entitled "PARALLEL MULTIPLIER THAT SUPPORTS MULTIPLE NUMBERS WITH DIFFERENT BIT LENGTHS," filed Oct. 21, 1996, describes a suitable multiplier and is incorporated by reference herein in its entirety. Associated with multiplier 151 are processing circuits for exponents and signs of floating point operations.

In a single clock cycle, multiplier 151 generates a product signal in the form of partial sum and carry signals that for integer data types, have about twice the data width of the source operands. The sum and carry signals must be added to determine the product. Field MULT_NEXT indicates which micro-instruction in the same entry should be executed in the following cycle. For the floating point data type, arithmetic logic units 152 executes micro-instruction ALU1_$\mu$I and adds the most significant bits of sum and carry signals generated from the product of mantissas. For integer data types, arithmetic logic units 152 and 153 execute micro-instructions ALU1_$\mu$I and ALU2_$\mu$I, in parallel, to sum and carry from multiplier 151. Arithmetic logic unit 152 adds the least significant bits of the sum and carry signals, and arithmetic logic unit 153 adds the most significant bits of the sum and carry signals. For a multiply-and-add instruction operand field C is read during execution of the MULT_$\mu$I for combination with the sum and carry signals during the next cycle.

Micro-instruction ALU1_$\mu$I includes fields ALU1_OP, ALU1_NEXT, ALU1_DTYPE, and ALU1_VALID. Micro-instruction ALU2 similarly includes fields ALU2_OP, ALU2_NEXT, ALU2_DTYPE, and ALU2_VALID. Fields ALU1_VALID and ALU2_VALID, ALU1_DTYPE and ALU2_DTYPE, and ALU1_NEXT and ALU2_NEXT respectively indicate whether the respective micro-instruction requires execution, data types for the operands, and micro-instructions to follow the respective operations. Fields ALU1_OP and ALU2_OP indicate operation codes that select operations that respective arithmetic logic units 152 and 153 perform.

In the exemplary embodiment, arithmetic logic unit 152 includes adders, aligners that align mantissas of floating point data elements for addition in arithmetic logic unit 153, shifters for logical left and right shift operations on data elements, and circuitry for executing logic class instructions which perform operations such as NOT, AND, and OR. Additionally, arithmetic logic unit 152 may include circuitry for shuffling or re-ordering data elements within a data vector to execute inter-element move class of instructions listed in Table A.7 below. Arithmetic logic unit 153 includes an adder and normalization and rounding logic for floating point data elements. Co-filed U.S. patent application Ser. No. 08/790,142 entitled "EXECUTION UNIT DATA PATHS FOR A VECTOR PROCESSOR", further describes execution units suitable for the exemplary embodiment of the invention and is incorporated by reference herein in its entirety.

Micro-instruction LSU_$\mu$I includes fields LSU_OP, LSU_NEXT, LSU_DTYPE, LSU_VALID, and POST_INC. Field LSU_VALID indicates whether the instruction requires execution. Field LSU_OP contains an operation code for load/store unit 154, and determines whether load/store unit 154 performs a load, a store, or a cache operation when load/store unit 154 executes micro-instruction LSU_$\mu$I. Load/store unit 154 is required for load/store class instructions listed in Table A.9 below and supports addressing modes where a register provides an effective address or arithmetic logic unit 152 calculates the effective address. Field POST_INC indicates whether the value in a register used in an address calculation should be incremented after the calculation. Field LSU_DTYPE indicates a data type for data elements. In the exemplary embodiment, load/store unit 154 is coupled to a data cache that contains data vectors in a 256-bit format, but data path 150 has 288-bit vector registers to accommodate 32 9-bit data elements. For load operations, load/store unit 154 reformats a 256-bit data value from the data cache to create a 288-bit data vector in a read buffer. Load/store unit 154 then signals that a load resulting from a previously issued micro-instruction LSU_

µI has returned data and a micro-instruction WRITE_µI in the same entry should now be eligible for issue. For store operations, the data cache system reformats 288-bit vectors in 256-bit form.

U.S. patent application Ser. No. 08/789,575, entitled "LOAD AND STORE UNIT FOR A VECTOR PROCESSOR,", describes a load/store unit suitable for the exemplary embodiment of the invention and is incorporated by reference herein in its entirety. Unlike multiplier 151, arithmetic logic unit 152, and arithmetic logic unit 153, load/store unit 154 does not always complete an operation or provide a result after a single clock cycle. Load operations have a latency that depends on the time required to read or write data from the cache system. A longer time is required for example, when there is a cache miss. Field LSU_NEXT indicates what scheduler 140 should do after issuing micro-instruction LSU_µI to load/store unit 154. For most store operations, field LSU_NEXT indicate that scheduler 140 should treat the load/store operation as complete after instruction LSU_µI is issued so that the instruction can be completed and retired, possibly before load/store unit 154 completes the operation. For load operations, field LSU_NEXT indicates that scheduler 140 should wait for load/store unit 154 to return data before issuing micro-instruction WRITE_µI to write the loaded value to its destination.

Micro-instruction WRITE indicates a write operation and includes fields WPORT_OP, WPORT_RD, WPORT2_RD, WPORT_ACC, WPORT_VALID, and MISC. Field WPORT_VALID indicates whether there is a write operation to perform. Field WPORT_OP indicates the source and destination for the write operation. Possible sources in the exemplary embodiment include output ports of arithmetic logic unit 152, arithmetic logic unit 153, both arithmetic logic units 152 and 153, accumulator 159, and a read port 156. Field WPORT_ACC selects which half (the most or the least significant bits) of data elements in accumulator 159 provide the value to be written. Possible destinations of the write operation are register file 155 and the special registers. Register file 155 has two write ports 157 that support simultaneous writing of two 288-bit vector values or two 32-bit scalar values. Fields WPORT_RD and WPORT2_RD indicate register numbers for the destination of a first value and an optional second value to be written. Field MISC indicates: whether the data elements have 9-bit data type which requires special conversions in LSU 154; and whether a result is double size.

Field WRITE does not include a next field because micro-instruction WRITE_µI, if valid, represents the last operation required to complete an instruction. Micro-instruction LSU_µI, if valid, is always the last or second to last operation if followed by a valid micro-instruction WRITE_µI. Once the last micro-instruction is complete, the instruction can be retired, which creates space for another instruction in decode buffer 130.

FIGS. 5A to 5J illustrate sequences for operations that execute instructions in the exemplary embodiment of the invention. A single micro-instruction WRITE_µI as shown in FIG. 5A is sufficient an instruction in a register move class, that writes an immediate value or a value from a source register to a destination in register file 155, accumulator 159, or a special register. FIG. 5B and 5C illustrate micro-instruction sequences for store instructions. FIG. 5B illustrates an instruction where a single LSU_µI initiates a write of a store operand to memory at an address indicated by an immediate value or a source register. FIG. 5C shows a store operation having a more complex addressing mode where an ALU1_µI calculates an effective address from source operands and an LSU_µI initiates a write of a store operand to memory at the effective address.

Micro-instruction sequences for load instructions are illustrated in FIG. 5D and 5E. FIG. 5D illustrates a load instruction that uses a source operand or immediate value as an address. An LSU_µI initiates a read from memory at the address, and a WRITE_µI saves the result from load/store unit 154. FIG. 5E illustrates a load instruction with a more complex addressing modes where an ALU1_µI calculates an effective address, an LSU_µI initiates a read from memory at the effective address, and a WRITE_µI saves the final result. For scheduling, each micro-instruction is completed in a single cycle, but a WRITE_µI does not immediately follow a LSU_µI because the time required for load/store unit 154 to return load data varies.

FIG. 5F illustrates a micro-instruction sequence where an ALU1_µI performs an operation such as an addition, substraction, effective address calculation, shift, logical, or shuffle operation on the source operands and a WRITE_µI saves a value to register file 155, accumulator 159, or special registers. Typically, the value saved is the result from arithmetic logic unit 152. For operations on double size operands, an ALU1_µI and an ALU2_µI are performed in parallel as shown in FIG. 5G, and a WRITE_µI saves the result from arithmetic logic units 152 and 153. FIG. 5H illustrates a micro-instruction sequence for instructions such as floating point additions and subtractions where an ALU1_µI aligns mantissas, an ALU2_µI combines and rounds the aligned values, and a WRITE_µI saves the result.

FIG. 5I illustrates a micro-instruction sequence for an instruction such as an integer multiply or multiply-and-accumulate. Multiplier 151 executes a MULT_µI by multiplying source operands to generate double sizes sum and carry values, adders in arithmetic logic units 152 and 153 execute an ALU1_µI and an ALU2_µI in parallel to add double sizes values, and a WRITE_µI saves the result. FIG. 5J illustrates a micro-instruction sequence for an instruction such as a floating point multiply where multiplier 151 executes a MULT_µI to multiplying mantissas of source operands and generate sum and carry values, arithmetic logic unit 152 executes an ALU1_µI to add the most significant bits of resulting sum and carry signals for each data element product and add exponents, arithmetic logic unit 153 executes an ALU2_µI to normalize and round the result form arithmetic logic unit 152, and a WRITE_µI saves the result from arithmetic logic unit 153.

The starting micro-instructions of an issued instruction use source operands that are fetched as part of the issue selection processes, but subsequent micro-instructions require results from the preceding operation and must be executed when the results of the preceding operation are available. Accordingly, micro-instructions depend on each other, and micro-instructions within an instruction must be executed in a specific order depending on the instruction. Thus, not all of the micro-instructions in an entry are issuable because some of the micro-instruction can only be issued in the sequence proper sequence as illustrated in FIGS. 5A to 5J. Instruction dependency logic 144 disables issue of micro-instructions that would interrupt the sequential execution of micro-instructions.

To maintain the required micro-instruction sequences, instruction dependency logic 144 includes for each entry of decode buffer 130 circuitry that checks the micro-instructions in the entry on a per functional unit basis and disables issue of specific micro-instructions. Such circuitry can be implemented with random logic that is coupled to the micro-instructions valid and next fields in decode buffer 130 to disable issue of micro-instructions under the circumstances described below.

Micro-instructions for multiplier 151 do not have any order dependency because a MULT_μI, if valid, is always a starting micro-instruction. For arithmetic logic unit 152, instruction dependency logic 144 determines whether a MULT_μI in the same entry as an ALU1_μI is valid, and if so disables issue of the ALU1_μI until after the MULT_μI issues. When the MULT_μI issues, field MULT_VALID is cleared making an ALU1_μI eligible for issue.

For arithmetic logic unit 153, instruction dependency logic 144 determines whether a MULT_μI or an ALU1_μI in the same entry as an ALU2_μI is valid. If the MULT_μI is valid, instruction dependency logic 144 disables issue of the ALU2_μI until after the MULT_μI issues. If the ALU1_μI is valid and field ALU1_NEXT indicates that the ALU2_μI follows the ALU1_μI, instruction dependency logic 144 disables issue of the ALU2_μI until after the ALU1_μI issues and the valid bit ALU1_VALID is cleared.

In the exemplary embodiment, an LSU_μI is either the first micro-instruction or follows an ALU1_μI. Accordingly, for load/store unit 154, instruction dependency logic 144 disables issue of an LSU_μI until after an ALU1_μI issues if the there is a valid ALU1_μI in the same entry as the LSU_μI.

A WRITE_μI, if valid, is always the last micro-instruction issued, and instruction dependency logic 144 disables issue of a WRITE_μI until all other valid micro-instructions in the same entry have been issued. Additionally, if field LSU_NEXT of an LSU_μI indicates wait for a data from load/store unit 154, issue of the WRITE_μI is further disable until load/store unit 154 returns load data. Field LSU_NEXT is reset when load data is returned so that the WRITE_μI can be issued.

Instruction dependency logic 144 also disables issue of micro-instructions to avoid conflicts that would occur if two micro-instruction sequences require the same execution unit at the same time. To select micro-instructions for issue, instruction dependency logic 146 matches each valid micro-instruction with a time slot for execution assuming that the starting micro-instruction of an unissued instruction or the next micro-instruction of an issued instruction is issued during the next cycle. For example, an unissued register move instruction such as illustrated in FIG. 5A has a WRITE_μI in time slot 1. An unissued instruction requiring the micro-instruction sequence of FIG. 5I has a MULT_μI in time slot 1, an ALU1_μI and an ALU2_μI in time slot 2, and a WRITE_μI time slot 3. If a MULT_μI for an instruction following the sequence of FIG. 5I is being executed, the instruction has an ALU1_μI and an ALU2_μI in time slot 1, and a WRITE_μI time slot 2. Micro-instructions of other instructions are assigned in a similar manner with the exception of micro-instructions WRITE_μI for load instructions which follow the sequence of FIG. 5D or 5E. A WRITE_μI for a load instruction is not assigned a time slot until load/store unit 154 indicates load data is ready, and then the WRITE_μI is in time slot 1. For reasons described below, the exemplary embodiment uses only three time slots even though unissued instructions having the sequence of FIG. 5J require four cycles to complete.

For each time slot, logic 144 determines whether the eligible micro-instructions in the time slot exceed the capabilities of the execution units. The limits for each time slot is: one MULT_μI; one ALU1_μI; one ALU2_μI; one LSU_μI; and two writes which may be from one or two WRITE_μI. Additionally, read ports 156 are limited to two source operands. If any of limits are exceeded, issue of some of the eligible but unissued instructions and/or micro-instructions WRITE_μI from issued load instructions are disabled. Micro-instructions MULT_μI can only be in slot 1 because MULT_μI if valid are always the starting instruction. Accordingly, instruction dependency logic 144 only requires logic for checking micro-instructions MULT_μI in slot 1. If slot 1 has more than one MULT_μI, the oldest unissued instruction requiring execution of a MULT_μI is not disabled but all newer unissued instructions requiring a MULT_μI are disabled.

Micro-instructions ALU1_μI can be in slot 1 or 2 but not slot 3. If either slot 1 or 2 has more than one ALU1_μI and an issued instruction has an ALU1_μI in that slot, all unissued instructions having an ALU1_μI in that slot are disabled. If no issued instruction has an ALU1_μI in a slot, the oldest unissued instruction having an ALUM_μI in the slot is not disabled by this logic but all newer instructions requiring an ALU1_μI in the slot are disabled.

Micro-instructions ALU2_μI can be in slot 1, 2, or 3. However, an ALU2_μI is in slot 3 only for an unissued instruction following the sequence of FIG. 5J. If more than one ALU2_μI is in slot 3, more than one MULT_μI will be in slot 1 and the logic described above for micro-instructions MULT_μI disables the correct unissued instructions. Accordingly, instruction dependency logic 144 does not require logic for checking ALU2_μI in slot 3. If either slot 1 or 2 has more than one ALU2_μI and an issued instruction has an ALU2_μI in that slot, all unissued instructions having an ALU2_μI in that slot are disabled. If no issued instruction has an ALU2_μI in that slot, the oldest unissued instruction requiring execution of an ALU2_μI is not disabled by this logic but all newer unissued instructions requiring an ALU2_μI in that slot are disabled.

Micro-instructions WRITE_μI have three classes. A WRITE_μI for an issued instruction other than a load is in Class A. A WRITE_μI for a load instruction after load/store unit 154 returns load data is in Class B. A WRITE_μI for an unissued instruction is in Class C. Issuing of class A WRITE_μI cannot be delayed because a class A WRITE_μI saves a result from an ALU1_μI or an ALU2_μI and arithmetic logic units 152 and 153 do not have output buffers. If a class A WRITE_μI were delayed, the output from arithmetic logic unit 152 or 153 may be replaced by new result and lost. However, load/store unit 154 has a read buffer that retains load data while a class B WRITE_μI is delayed. Load/store unit 154 disables issue of load instructions while the read buffer is nearly full.

Instruction dependency logic 144 contains logic for checking micro-instructions WRITE_μI in each of slots 1, 2, and 3. Unissued instructions having the sequence shown in FIG. 5J could execute a WRITE_μI in a fourth cycle, but checking a slot 4 is not required because checking MULT_μIs in slot 1 handles these instructions. If the number of writes required by class A micro-instructions WRITE_μI in a slot is two, issue of micro-instructions from any instructions having a class B or class C WRITE_μI in that slot is disabled. Otherwise, 1 or 2 writes not used by class A WRITE_μIs, if any, are allotted to the oldest one or two instructions having a class A or B WRITE_μI, but any newer instructions containing class A or B instructions in the slot are disabled.

Issue of unissued instructions may be further limited by availability of read ports 156. Issue of all unissued instructions requiring both source operand A and B are disabled if any issued instruction has a micro-instruction in slot 1 that requires a source operand C. Issue of all unissued instructions are disable if two micro-instructions from issued instructions require operands C in slot 1. In the exemplary embodiment, conflicts cannot arise from more than two micro-instructions from issued instructions requiring source operands because ALU1_μI and LSU_μI are the only micro-instructions that may require source operands after an instruction is issued.

Issuing logic 146 issues micro-instructions from the eligible entries that are not disabled. For each execution unit, issuing logic 146 attempts to locate the oldest micro-instruction that operand dependency logic 142 indicates is eligible for issue and instruction dependency logic 144 does not disable. Issuing logic 146 fetches source operands during issue selection so that the source operands are available at the start of the next cycle when the issued micro-instructions are executed.

The microfiche appendix includes a listing of a computer program in circuit description language. The listing represents an exemplary implementation of scheduler 140.

Although the invention has been described with reference to particular embodiments, the description is only an example of the invention's application and should not be taken as a limitation. In particular, even though much of preceding discussion was aimed at a specific instruction set for a SIMD processor, alternative embodiments of this invention are not restricted to the instruction set of the exemplary embodiment or SIMD processors. Various adaptations and combinations of features of the embodiments disclosed are within the scope of the invention as defined by the following claims.

Instruction Set List

The following tables list the instruction set for the exemplary embodiment of the invention illustrated in FIG. 1. The instructions operate on scalar data and vector data where data elements can have a number of data types including 8-bit, 9-bit, 16-bit, and 32-bit integers (int8, int9, int16, and int32) and a 32-bit floating point data type.

Table A.1 lists flow control instructions which are mostly processed in instruction fetch unit 110. Flow control instructions that affect registers other the program counter are passed from the instruction fetch unit 110 to decoder 120 and are decoded to create an entry in decode buffer 130.

TABLE A.1

| Mnemonic | Description |
|---|---|
| | Control Flow Class |
| VCBR | Conditional Branch |
| VCBRI | Conditional Branch Indirect |
| VD1CBR | Decrement VCR1 and Conditional Branch |
| VD2CBR | Decrement VCR2 and Conditional Branch |
| VD3CBR | Decrement VCR3 and Conditional Branch |
| VCJSR | Conditional Jump to Subroutine |
| VCJSRI | Conditional Jump to Subroutine Indirect |
| VCRSR | Conditional Return from Subroutine |
| VCINT | Conditional Interrupt of Co-processor |
| VCJOIN | Conditional Join With Co-processor |
| VCCS | Conditional Context Switch |
| VCBARR | Conditional Barrier |
| VCHGCR | Change Control Register (VCSR) |

Table A.2 list logic class instructions which perform logic operations on operands A or B and store the result in register D. The logical class instructions support Boolean data types and are affected by the element mask.

TABLE A.2

| Mnemonic | Description |
|---|---|
| | Logic Class |
| VNOT | NOT - ~ B |
| VAND | AND - (A & B) |
| VCAND | Complement AND - (~A & B) |
| VANDC | AND Complement - (A & ~B) |
| VNAND | NAND - ~ (A & B) |
| VOR | OR - (A \| B) |
| VCOR | Complement OR - (~A \| B) |
| VORC | OR Complement - (A \| ~B) |
| VNOR | NOR - ~ (A \| B) |
| VXOR | Exclusive OR - (A ^ B) |
| VXNOR | Exclusive NOR - ~ (A ^ B) |

Table A.3 lists shift/rotate class operations. The shift/rotate class instructions operate on the int8, int9, int16 and int32 data types (not floating point data) and are affected by the element mask.

TABLE A.3

| Mnemonic | Description |
|---|---|
| | Shift/Rotate Class |
| VDIV2N | Divide by Power of 2 |
| VLSL | Logical Shift Left |
| VLSR | Logical Shift Right |
| VROL | Rotate Left |
| VROR | Rotate Right |

Table A.4 lists arithmetic class instructions. The arithmetic class instructions, in general, support the int8, int9, int16, int32, and floating point data types and are affected by the element mask. Instruction VCMPV operates on the element mask and is not affected by the element mask.

TABLE A.4

| Mnemonic | Description |
|---|---|
| | Arithmetic Class |
| VASR | Arithmetic Shift Right |
| VADD | Add |
| VAVG | Average |
| VSUB | Subtract |
| VASUB | Absolute of Subtract |
| VMUL | Multiply |
| VMULA | Multiply to Accumulator |
| VMULAF | Multiply to Accumulator Fraction |
| VMULF | Multiply Fraction |
| VMULFR | Multiply Fraction and Round |
| VMULL | Multiply Low |
| VMAD | Multiply and Add |
| VMADL | Multiply and Add Low |
| VADAC | Add and Accumulate |
| VADACL | Add and Accumulate Low |
| VMAC | Multiply and Accumulate |
| VMACF | Multiply and Accumulate Fraction |
| VMACL | Multiply and Accumulate Low |
| VMAS | Multiply and Subtract from Accumulator |
| VMASF | Multiply and Subtract from Accumulator Fraction |
| VMASL | Multiply and Subtract from Accumulator Low |
| VSATU | Saturate To Upper Limit |
| VSATL | Saturate to Lower Limit |
| VSUBS | Subtract Scalar and Set Condition |
| VCMPV | Compare Vector and Set Mask |

TABLE A.4-continued

Arithmetic Class

| Mnemonic | Description |
| --- | --- |
| VDIVI | Divide Initialize |
| VDIVS | Divide Step |
| VASL | Arithmetic Shift Left |
| VASA | Arithmetic Shift Accumulator by 1 bit |

Table A.5 lists instructions referred to herein as MPEG class since the operations performed are particularly useful for MPEG video and audio encoding and decoding. The MPEG class instructions support the int8, int9, int16 and int32 data types and are affected by the element mask.

TABLE A.5

MPEG Class

| Mnemonic | Description |
| --- | --- |
| VAAS3 | Add and Add Sign of (−1, 0, 1) |
| VASS3 | Add and Subtract Sign of (−1, 0, 1) |
| VEXTSGN2 | Extract Sign of (−1, 1) |
| VEXTSGN3 | Extract Sign of (−1, 0, 1) |
| VXORALL | XOR the least-significant-bit of all elements |

Table A.6 lists data type conversion instructions. Each data type conversion instruction supports specific data types and is not affected by the element mask since the architecture does not support more than one data type in a vector register.

TABLE A.6

Data Type Conversion Class

| Mnemonic | Description |
| --- | --- |
| VCVTIF | Convert Integer to Floating point |
| VCVTFF | Convert Floating Point to Fixed Point |
| VROUND | Round Floating Point to Integer |
| VCNTLZ | Count Leading Zeroes |
| VCVTB9 | Convert Byte9 Data Type |

Table A.7 lists inter-element arithmetic class instructions which perform arithmetic combinations of elements within the same vector data. The inter-element arithmetic class instructions support the int8, int9, int16, int32 and floating point data types. The term quad is used herein to refer to four data elements include two adjacent data elements from a first data vector and two data elements from the same positions in a second data vector.

TABLE A.7

Inter-element Arithmetic Class

| Mnemonic | Description |
| --- | --- |
| VADDH | Add Two Adjacent Elements |
| VAVGH | Average Two Adjacent Elements |
| VAVGQ | Average Quad Elements |
| VMAXE | Maximum Exchange Even/Odd Elements |

Table A.8 lists inter-element move class instructions which move elements within a vector register. The inter-element move class instructions support 8-bit, 9-bit, 16-bit, and 32-bit data sizes.

TABLE A.8

Inter-element Move Class

| Mnemonic | Description |
| --- | --- |
| VESL | Element Shift Left by 1 |
| VESR | Element Shift Right by 1 |
| VSHFL | Shuffle to Even/Odd Elements |
| VSHFL | Shuffle to Even/Odd Elements |
| VSHFLH | Shuffle to Even/Odd Elements High |
| VSHFLL | Shuffle to Even/Odd Elements Low |
| VUNSHFL | Unshuffle to Even/Odd Elements |
| VUNSHFLH | Unshuffle to Even/Odd Elements High |
| VUNSHFLL | Unshuffle to Even/Odd Elements Low |

Table A.9 lists the load and store instructions which access memory and or register file 155. The load and store instructions support, in addition to byte, halfword and word data sizes, special byte9 related data size operations, and are not affected by the element mask.

TABLE A.9

Load/Store Class

| Mnemonic | Description |
| --- | --- |
| VL | Load |
| VLD | Load Double |
| VLQ | Load Quad |
| VLCB | Load From Circular Buffer |
| VLR | Load Reverse Element Order |
| VLWS | Load With Stride |
| VST | Store |
| VSTD | Store Double |
| VSTQ | Store Quad |
| VSTCB | Store To Circular Buffer |
| VSTR | Store Reverse Element Order |
| VSTWS | Store With Stride |

Table A.10 lists register move instructions which move data without accessing memory. Most register move instructions support the int8, int9, int16, int32 and floating point data types and are not affected by the element mask. Instruction VCMOVM is affected by the element mask.

TABLE A.10

Register Move Class

| Mnemonic | Description |
| --- | --- |
| VLI | Load Immediate |
| VMOV | Move |
| VCMOV | Conditional Move |
| VCMOVM | Conditional Move with Element Mask |
| VEXTRT | Extract An Element |
| VINSERT | Insert An Element |

Table A.11 lists cache operations which cause data transfer involving external memory and an on-chip data cache or scratch pad memory.

TABLE A.11

Cache Operation class

| Mnemonic | Description |
| --- | --- |
| VCACHE | Cache operation for data or instruction cache |

TABLE A.11-continued

Cache Operation class

| Mnemonic | Description |
| --- | --- |
| VPFTCH | Prefetch into data cache |
| VWBACK | Writeback from data cache |

We claim:

1. A processor comprising:
   a plurality of execution units, each execution unit being adapted to complete a single-cycle operation;
   a decode buffer which is partitioned into a plurality of entries, wherein each entry includes:
      a plurality of micro-instruction fields for storage of micro-instructions; and
      a field for identifying which of the micro-instruction is to be executed first; and
      a decoder adapted to decode instructions, wherein for each instruction decoded, the decoder writes one or more micro-instructions in the micro-instruction fields of an entry associated with the instruction, each micro-instruction identifying an operation to be executed by one of the execution units during execution of the instruction by the processor.

2. The processor of claim 1, wherein a first of the micro-instruction fields for a first micro-instruction includes a sub-field identifying a second of the micro-instruction fields for a second micro-instruction that is to be executed after the first micro-instruction.

3. The processor of claim 2, further comprising a scheduler coupled to the decode buffer, wherein the scheduler comprises:
   issuing logic that attempts to issue micro-instructions from the decode buffer to the execution units; and
   instruction dependency checking logic to prevent the issuing logic from issuing a micro-instruction that would interfere with in-order execution of the first and second micro-instructions.

4. The processor of claim 3, wherein instruction dependency checking logic further comprises logic coupled to the micro-instruction fields that generates from the micro-instructions stored the micro-instruction fields that signals that control the relative order in which the issuing logic can issue micro-instructions from an entry.

5. The processor of claim 1, wherein each entry further comprises a first operand field that identifies a source operand for an instruction associated with the entry and a second operand field that identifies a destination operand for the instruction.

6. The processor of claim 1, wherein each micro-instruction field is dedicated for use by an associated one of the execution units.

7. The processor of claim 6, wherein each micro-instruction field comprises a sub-field for a value indicating whether the micro-instruction field is storing a valid micro-instruction for execution by the execution unit associated with the micro-instruction field.

8. The processor of claim 1, further comprising a scheduler that is coupled to the buffer and schedules execution of micro-instructions in the buffer.

9. A processor comprising:
   a plurality of execution units, each execution unit being adapted to complete a single-cycle operation;
   a decode buffer which is partitioned into a plurality of entries, wherein each entry includes:
      a plurality of micro-instruction fields for storage of micro-instructions;
      a first operand field that identifies a source operand for an instruction associated with the entry; and
      a second operand field that identifies a destination operand for the instruction;
   a decoder adapted to decode instructions, wherein for each instruction decoded, the decoder writes one or more micro-instructions in the micro-instruction fields of an entry associated with the instruction, each micro-instruction identifying an operation to be executed by one of the execution units during execution of the instruction by the processor; and
   a scheduler coupled to the decode buffer, wherein the scheduler comprises:
      issuing logic that attempts to issue micro-instructions from the decode buffer to the execution units; and
      operand dependency logic coupled to compare the first operand field in a first of the entries to the second operand field in a second of the entries, the first entry being associated with an instruction that is newer than an instruction that is associated with the second entry, wherein the operand dependency logic prevents the issuing logic from issuing a micro-instruction from the first entry if the first field in the first entry identifies the same operand as the second field in the second entry.

10. A processor comprising:
    plurality of execution units, each execution unit being adapted to complete a single-cycle operation;
    a decode buffer which is partitioned into a plurality of entries, wherein each entry includes a plurality of micro-instruction fields for storage of micro-instructions;
    a decoder adapted to decode instructions, wherein for each instruction decoded, the decoder writes one or more micro-instructions in the micro-instruction fields of an entry associated with the instruction, each micro-instruction identifying an operation to be executed by one of the execution units during execution of the instruction by the processor; and
    a scheduler coupled to the decode buffer, wherein the scheduler comprises:
       issuing logic that attempts to issue micro-instructions from the decode buffer to the execution units; and
       instruction dependency checking logic that controls the relative order in which the issuing logic can issue micro-instructions from an entry.

11. The processor of claim 10, wherein each entry further comprises one or more fields that define the relative order in which the scheduler issues micro-instructions from the entry.

12. A method for operating a processor, comprising:
    sequentially decoding instructions in a program order, wherein decoding an instruction that requires multiple cycles for execution comprises breaking the instruction into a plurality of micro-instructions such that each micro-instruction identifies a single-cycle operation and is associated with an execution unit for executing the single-cycle operation;
    storing the micro-instructions in a buffer that comprises a plurality of entries, wherein the set of micro-instructions decoded from a single instruction are stored in a single one of the entries, and storing the micro-instructions comprises writing to the entry associated with an instruction, information that indicates a relative order for execution of the micro-instructions decoded from the instruction; and scheduling the micro-instructions for execution according to the availability of the execution units associated with the micro-instructions.

13. The method of claim 12, wherein scheduling the micro-instructions permits execution micro-instructions out of the program order for the instructions.

14. The method of claim 13, wherein scheduling the micro-instructions limits execution of micro-instructions that are decoded from the same instruction to the relative order for that instruction.

15. The method of claim 12, further comprising simultaneously executing micro-instructions from a plurality of entries.

* * * * *